(12) United States Patent
Magpuri et al.

(10) Patent No.: US 11,794,121 B1
(45) Date of Patent: Oct. 24, 2023

(54) THEME OR AMUSEMENT PARK ATTRACTION USING HIGH FRAME RATE ACTIVE SHUTTER TECHNOLOGY

(71) Applicant: Falcon's Treehouse, LLC, Orlando, FL (US)

(72) Inventors: Cecil D. Magpuri, Orlando, FL (US); David Schaefer, Orlando, FL (US); Syed Saham Ali, Orlando, FL (US); David Consolo, Orlando, FL (US)

(73) Assignee: FALCON'S BEYOND BRANDS, LLC, Orlando, FL (US)

( * ) Notice: Subject to any disclaimer, the term of this patent is extended or adjusted under 35 U.S.C. 154(b) by 141 days.

(21) Appl. No.: 17/544,441

(22) Filed: Dec. 7, 2021

Related U.S. Application Data

(60) Provisional application No. 63/123,303, filed on Dec. 9, 2020.

(51) Int. Cl.
*A63G 31/02* (2006.01)
*H04N 13/332* (2018.01)
*H04N 9/31* (2006.01)

(52) U.S. Cl.
CPC ........... *A63G 31/02* (2013.01); *H04N 9/3147* (2013.01); *H04N 13/332* (2018.05)

(58) Field of Classification Search
CPC ........ A63G 31/00; A63G 31/02; A63G 31/16; A63G 7/00; G02B 27/0176; H04N 9/3147; H04N 13/332; G06T 19/00; G06T 15/00
USPC ............................................. 472/60, 61, 130
See application file for complete search history.

(56) References Cited

U.S. PATENT DOCUMENTS

| | | | |
|---|---|---|---|
| 2016/0011423 A1* | 1/2016 | Thurber ................. | G02B 27/64 345/8 |
| 2017/0323482 A1* | 11/2017 | Coup .................... | H04N 13/363 |
| 2018/0369702 A1* | 12/2018 | Hake ..................... | A63G 25/00 |
| 2019/0278091 A1* | 9/2019 | Smits ................... | H04N 13/363 |
| 2020/0105061 A1* | 4/2020 | Goergen ............ | G02B 27/0172 |

* cited by examiner

*Primary Examiner* — Kien T Nguyen
(74) *Attorney, Agent, or Firm* — Perkins Coie LLP

(57) ABSTRACT

A high frame rate image system in a theme park attraction simultaneously displays images that are unique to each individual viewer. Although all viewers in a room or theater may be watching the same screen or area, they may see entirely different images. This allows the attraction to present more complex story narratives, and also allows the projected images to be matched to specific guests.

8 Claims, 2 Drawing Sheets

THEME OR AMUSEMENT PARK ATTRACTION USING HIGH FRAME RATE ACTIVE SHUTTER TECHNOLOGY

BACKGROUND OF THE INVENTION

Story driven, media-based experiences have been developed for theme parks and attractions. Typically, guests move from scene to scene in subsequent rooms or areas either via a ride vehicle, moving walkway or belt, or by walking. However, everyone sees the same images and has the same experience. Accordingly, improvements are needed in these and related types of attractions and systems.

SUMMARY OF THE INVENTION

The field of the invention is theme or amusement park attraction using high frame rate active shutter technology. The attraction includes a system that combines a group experience with 2D or 3D images. Utilizing high frame rate image or projection technology, single or multiple projection screens, surfaces, spaces or displays (collectively referred to here as screens) may be provided in an attraction, with each screen simultaneously displaying images that are unique to each individual viewing the screen. The immersive attraction can be scaled to fit the commercial facility in which it is being integrated such as gaming arcade, amusement or theme park and upgraded to include user interactivity.

The system simultaneously creates images that, at least at certain time intervals, are only visible to a certain subsets of guests. Although all guests are watching the same screen, they may see entirely different video or motion images. This allows the attraction to present more complex story narratives, and also allows the images to be matched to specific guests.

BRIEF DESCRIPTION OF THE DRAWINGS

In the drawings the same element number indicates the same element in each of the views.

DETAILED DESCRIPTION

Figure 1:
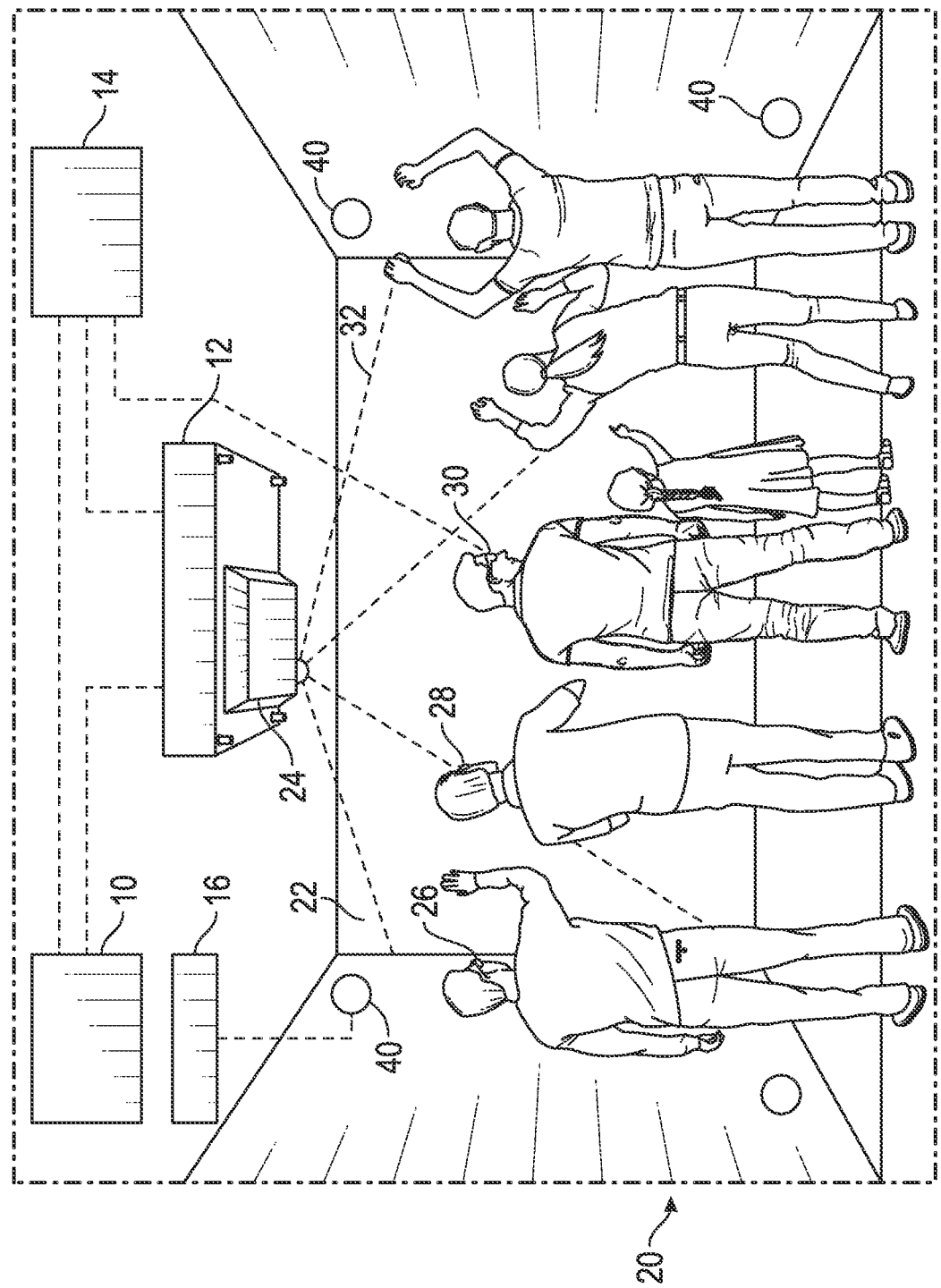
FIG. 1 is a schematic view of a first embodiment.
Figure 2:
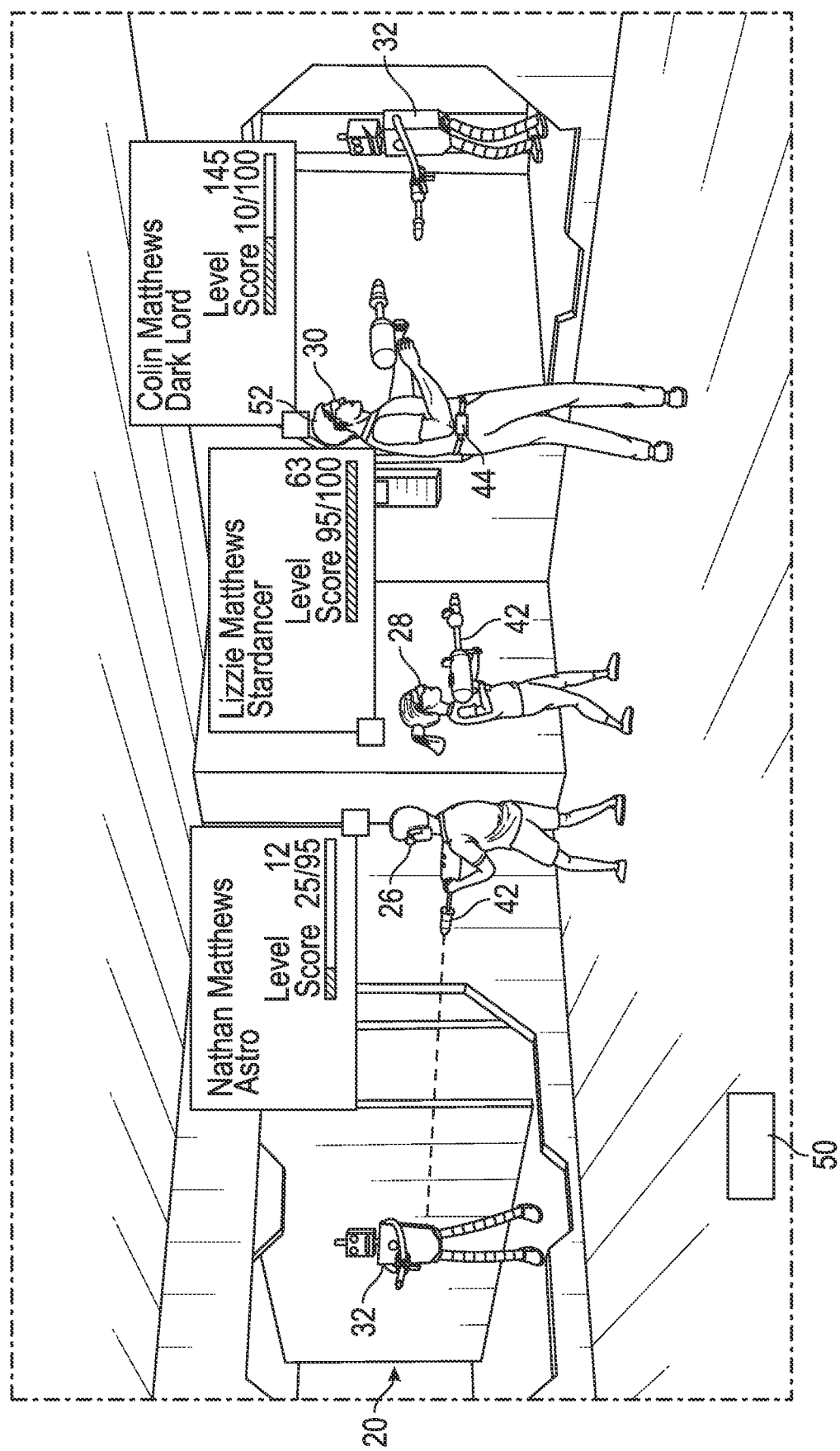
FIG. 2 is a schematic view of a second embodiment.

As shown in FIGS. 1 and 2, an attraction may be a linear walkthrough experience or an open arena style experience. Guests are provided high frame rate active shutter 3D glasses 26, 28, 30 to wear throughout the experience. The projectors 24 located within the attraction are high frame rate projectors, for example projectors capable of projecting video content at 120 FPS, 240 FPS, 360 FPS or higher. The frames may be segmented into groups of 30 to 60 frame packets and synchronized with the active shutter glasses. Therefore, a 360 FPS projector can deliver 6 simultaneous video feeds of 60 FPS at a time. Optionally, a motion and/or position detection/capture system 16 is linked to sensors in the room or space 20 to track the guest position or movement, as shown in FIG. 1, or handheld interactive devices 42, and/or a body mounted beacon 44 as shown in FIG. 2. This enables a layer of interactivity that is custom to each guest's own visual media content feed. Custom audio synchronized with the custom video media may be provided to guests via ear pods, headphones, or sound speakers on or in the glasses.

In attractions where guests are in or on a ride vehicle 50, the position and/or movement of a ride vehicle may be tracked. In this case, individual guests or their handheld interactive devices need not also be individually tracked. For example, with multiple ride vehicles in a single room, and multiple guests in each ride vehicle, the system may provide guests in each ride vehicle a point of view, or with video programming, unique to their vehicle, and different from the other ride vehicles. Custom audio may be provided by sound speakers in or on the vehicle.

The projectors 24 and the control system 10 and the synchronizing system 14 may be linked to each other via wire or wirelessly. The active shutter glasses are linked to the synchronizing system 14 and/or the control system 10 wirelessly. As used here, "room" includes a space or location, including outdoor spaces. The projectors and screens 22 may be replaced by other types of displays. The screens may be omitted with images created on other surfaces or spaces, such as with holographic images. The projection or image system 12 creates moving images visible to the guests. Generally, a projection or image system 12 may use front or rear projection, LED displays, and similar or equivalent techniques. The users wearing the active shutter glasses may move through the attraction on a vehicle, moving platforms, elevators, escalators, moving walkways, etc. As used here simultaneously means events or actions occurring sufficiently close in time that the temporal difference between them is not perceptible to humans. The active shutter glasses may be eyeglasses, a face visor or face shield, with or without using a headpiece or helmet. For vehicle applications, the active shutter glasses may alternatively be a viewing window or port.

Thus, in one aspect, an entertainment system includes a sequence of projection rooms, each projection room including a high frame rate image projection system for projecting 2D and/or 3D images, and an audio system 52 for providing audio in the room. A control system is linked to the image projection system, the audio system, motion capture system and the control system accessing stored digital content. An integrated synchronizing system of active shutter glasses disseminates media content frames to specific users within the projection area. Each user will then see different digital content within the same projection area as other users.

Thus, novel systems and methods have been shown and described. Various changes and substitutions may of course be made without departing from the spirit and scope of the invention. The invention, therefore, should not be limited, except by the following claims and their equivalents.

The invention claimed is:
1. A system, comprising:
one or more rooms, each room including a high frame rate image system for creating 2D and/or 3D images;
a control system linked to each image system, the control system accessing stored digital media; and
the control system linked to a plurality of active shutter glasses worn by users, to selectively display images to the users in the rooms, whereby the images displayed to a first user are different from the images displayed to a second user in the same room, at the same time.
2. The system of claim 1 further including a motion capture system for capturing the motion of a participant in the room; and/or position of an interactive device and adjusting the media content display based on the position of person or device.
3. The system of claim 2 with the motion capture system having a plurality of motion capture sensors located within the room, the sensors tracking one or more objects worn or held by the user.

4. The system of claim 2 wherein the control system and the motion capture system are linked to each other.

5. An entertainment system, comprising:
a plurality of projection screens in a room;
a high frame rate image projection system for projecting 2D and/or 3D images onto the projection screens;
an audio system for providing audio in the room;
a control system linked to the image projection system and the audio system; and
first and second pairs of active shutter glasses wirelessly linked to the control system, wherein the first pair of active shutter glasses displays images different from the second pair of active shutter glasses.

6. The system of claim 5 further including a motion capture system linked to the control system, the motion capture system detecting the motion or position of a person in the room wearing the first pair of active shutter glasses, and/or a device in the room, and the control system selecting or adjusting the images displayed by the first pair of active shutter glasses based on the detected motion or position of the person and/or the device.

7. The system of claim 6 with the motion capture system having a plurality of motion capture sensors in the room, the sensors tracking one or more objects worn or carried by the participant.

8. A method of operating an entertainment venue, comprising:
providing first and second distinct moving image sequences simultaneously onto or at the same screen or place in an entertainment venue, at 240 FPS or higher;
providing a first guest with first active shutter glasses wirelessly connected to a control system;
providing a second guest with second active shutter glasses wirelessly connected to the control system;
operating the control system to control the first active shutter glasses to allow the first guest to see the first moving image sequence but not the second moving image sequence; and
operating the control system to control the second active shutter glasses to allow the second guest to see the second moving image sequence but not the first moving image sequence.

\* \* \* \* \*